(12) United States Patent
Aalberg

(10) Patent No.: US 11,718,252 B2
(45) Date of Patent: Aug. 8, 2023

(54) BUMPER ARRANGEMENT

(71) Applicant: Benteler Automobiltechnik GmbH, Paderborn (DE)

(72) Inventor: Johannes Aalberg, Gjovik (NO)

(73) Assignee: Benteler Automobiltechnik GmbH, Paderborn (DE)

( * ) Notice: Subject to any disclaimer, the term of this patent is extended or adjusted under 35 U.S.C. 154(b) by 100 days.

(21) Appl. No.: 17/399,862

(22) Filed: Aug. 11, 2021

(65) Prior Publication Data

US 2022/0048455 A1 Feb. 17, 2022

(30) Foreign Application Priority Data

Aug. 13, 2020 (DE) .................. 10 2020 121 326.3
Oct. 21, 2020 (DE) .................. 10 2020 127 736.9

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01); *B60R 2019/1806* (2013.01)

(58) Field of Classification Search
CPC .. B60R 19/34; B60R 19/18; B60R 2019/1806
See application file for complete search history.

(56) References Cited

U.S. PATENT DOCUMENTS

| 5,498,045 | A | 3/1996 | Morgan et al. | |
|---|---|---|---|---|
| 6,349,521 | B1 * | 2/2002 | McKeon | E04C 3/06 52/843 |
| 7,108,303 | B2 * | 9/2006 | Bladow | B60R 19/18 293/122 |
| 7,163,241 | B2 * | 1/2007 | Liu | B60R 19/18 293/121 |
| 8,690,207 | B2 | 4/2014 | Gaisne et al. | |
| 10,835,942 | B2 * | 11/2020 | Weykamp | B21D 35/005 |
| 2011/0121587 | A1 | 5/2011 | Handing et al. | |

FOREIGN PATENT DOCUMENTS

| EP | 2 325 058 | 5/2011 |
|---|---|---|
| JP | 2003-146156 | 5/2003 |

* cited by examiner

*Primary Examiner* — Dennis H Pedder
*Assistant Examiner* — Melissa Ann Bonifazi
(74) *Attorney, Agent, or Firm* — Henry M. Feiereisen LLC

(57) ABSTRACT

A bumper arrangement includes a cross member and two deformation elements for arrangement between end regions of the cross member and longitudinal members of a motor vehicle. The cross member is hollow with a front and rear walls and upper and lower walls. The front wall has a depression extending in longitudinal direction of the cross member. The depression has a deepest region extending at a distance from the rear wall. The upper and lower walls of the cross member each have in the end regions a further depression which extends in longitudinal direction of the cross member, so that the upper wall and the lower wall are more corrugated in the end regions than in a central region of the cross member, so that the distance between the front wall and the rear wall in the end regions is smaller than in a central region of the cross member.

20 Claims, 5 Drawing Sheets

BUMPER ARRANGEMENT

CROSS-REFERENCES TO RELATED APPLICATIONS

This application claims the priority of German Patent Applications, Serial No. 10 2020 121 326.3, filed Aug. 13, 2020, and Serial No. 10 2020 127 736.9, filed Oct. 21, 2020, pursuant to 35 U.S.C. 119(a)-(d), the disclosure(s) of which is/are incorporated herein by reference in its entirety as if fully set forth herein.

BACKGROUND OF THE INVENTION

The invention relates to a bumper arrangement.

The following discussion of related art is provided to assist the reader in understanding the advantages of the invention, and is not to be construed as an admission that this related art is prior art to this invention.

A bumper arrangement typically includes a cross member and two deformation elements (crash boxes) for installation to the front side and rear side of a motor vehicle, e.g. car, to absorb the impact energy of smaller impact. The deformation elements are hereby installed between end portions of the cross member and longitudinal members of the motor vehicle. The cross member should be light and rigid, so that the impact force can be transferred to the deformation elements. At the same time, the bending stiffness of the cross member may not be too high so as to maintain the necessary flexibility in the event of an impact at a higher speed to absorb energy as the cross member deforms. These demands pose problems for the automobile industry. For example, when the cross member deforms too easily in its end regions, e.g. because its upper and lower walls buckle or causing the cross member to even break off from the crash box when exposed to a high point load, then the crash box deforms only with a time delay. This time delay may lead in a force-path diagram, in which the force required for deformation is plotted over the penetration depth into the motor vehicle, to a drop of the force-path curve. As a result, the maximum permissible force and the resultant deformation work as product of force x path cannot be optimally utilized. One approach to address this problem, involves configuring regions of the crash box with triggers, for example with structures to design the crash box impact-softer.

It would be desirable and advantageous to provide an improved bumper arrangement to obviate prior art shortcomings.

SUMMARY OF THE INVENTION

According to one aspect of the present invention, a bumper arrangement includes a cross member designed as a hollow profile and having a central region and end regions, the cross member having a front wall, a rear wall, an upper wall and a lower wall, the front wall having a depression which extends in a longitudinal direction of the cross member and has a deepest region which extends at a distance from the rear wall, wherein the upper and lower walls in the end regions of the cross member each have a further depression which extends in the longitudinal direction of the cross member, so that the upper wall and the lower wall in the end regions are depressed more than in the central region of the cross member, so that the distance between the front wall and the rear wall in the end regions is smaller than in the central region of the cross member, and two deformation elements for arrangement between end regions of the cross member and longitudinal members of a motor vehicle.

The deformation elements can represent crash boxes that are arranged between the longitudinal members of the motor vehicle and the end regions of the cross member. The hollow profile for the cross member may be designed as an extruded single-chamber profile or multi-chamber profile. The hollow profile can have an essentially rectangular cross section.

As a consequence of the presence of the further depressions in the upper and lower walls, the upper wall and the lower wall can be curved more in the end regions than in a central region of the cross member. As a result, the distance between the front wall and the rear wall is smaller in the end regions than in the central region of the cross member. In other words, the depth of the cross member as measured in longitudinal direction of the motor vehicle is smaller in the end portions because the front wall is located closer to the rear wall.

By reducing the distance between the front wall and the rear wall, the distance of the deepest region of the depression to the rear wall in the end regions is less. This reduction has a significant effect on the course of the deformation and enables the crash box to deform at an earlier point in time before the deformation of the cross member is complete, because the depression in the front wall represents a trigger for the crash box. Therefore, the depression is particularly deep in the area of the deformation elements, i.e. in the region of the anterior end portions of the cross member. The distance between the front wall and the rear wall can be selectively adjusted such that the deepest region of the depression touches the rear wall of the cross member early on in the event of an impact. At the same time, the end region can be made flexible enough configuring the upper and lower walls with a greater curvature. In addition, the depression can be configured more rigid than the upper and lower walls, so that the impact force can be transferred from the front wall via the depression into the rear wall. This load path across the depression into the rear wall causes the crash box to be acted upon earlier with a higher impact force, so that the force-path characteristic encounters a smaller drop of the force because the energy absorption of the cross member is superimposed by the energy absorption of the deformation element. More deformation work can therefore be realized at lower penetration depth and without increase of the penetration depth and higher impact forces can be absorbed.

Another advantage of a bumper arrangement according to the invention is also due to the depressions in the upper and lower walls. The mentioned depressions are arranged in the end regions in order to amplify the curvature of the upper and lower walls there. As a result, the central region becomes more rigid than the end regions. In the event of an impact that does not occur in the area of the crash boxes but in the central region of the cross member, the depressions are partially compressed. At the same time, the same depressions in the outer end portions, i.e. at the free ends of the cross member, cause that the upper and lower walls can be stretched so that the distance between the front wall and the rear wall increases. These properties of the depressions, i.e. to be able to compensate both compressive stress and tensile stress, allow a rotation of the cross member about the inner front edge of the deformation elements, i.e. about the region of the crash boxes in facing relation to the vehicle center axis. The ends of the cross members are widened during this load case, whereas the portions of the end regions located further inwards are compressed. Both of these in turn contribute to the energy reduction.

The end portions thus have a relatively high resilience. On one hand, the deep depression can touch early on the rear wall in the event of an impact in the area of the deformation elements and thus initiate the deformation of the crash box. On the other hand, in the event of a different load case, the afore-described rotational movement enables a widening of the outer ends of the cross member and compressing of the portions of the end regions arranged toward the transition zone.

According to another advantageous feature of the invention, the cross member can be an extrusion profile, with the depressions in the end regions being made by a forming process. The depressions in the end regions are thus subsequently produced by shaping the extruded profile. It is possible to make the depression in the front wall ultimately through extrusion. It is possible to subsequently deepen the depression.

Due to the manufacturing process, the depression in the front wall can have a cross section that is constant over the entire length of the bumper arrangement. The cross member may in conformity to a configuration of a front end of a motor vehicle configured in an arc-shaped manner, with the concave side of the cross member facing to the center of the vehicle. To conform to the arc-shaped rear wall of the cross member, the deformation elements can have front sides, which conform to the orientation of the rear wall of the cross member. The deformation elements can be adapted to the height of the cross member or be designed lower. However, they can also be higher than the cross member and protrude or embrace it above and/or below.

The extrusion profile can be configured as a single-chamber profile or as a multi-chamber profile. In the latter case, any inside walls in the end regions should be removed so that the deepest region of the depression in the end regions extends to the rear wall at a distance thereto. The depressions in the end regions should initially, i.e. before the crash, not come into contact with the rear wall, but have a depth that enables an early force transfer between the front wall and the rear wall or the adjacent crash box.

According to another advantageous feature of the invention, the depression in the front wall can have a distance to the rear wall which distance is smaller than a distance in the central region of the cross member. The depression in the front wall is thus assigned a particular importance in the area of the end portions. The distance is greater in the central region of the cross member. As a result, the cross member has a higher bending stiffness in the central region than in the end regions. The effect of a thus-formed cross member is the absence of a very impact-rigid connection between the cross member and the deformation elements, but rather results in a cross member which is allowed to deform and can execute a rotational movement in the area of the crash boxes. The outermost end of the cross member is stretched in a targeted manner, while the cross member is compressed on the facing inner sides of the crash boxes. Due to the deformation during rotation, more energy is absorbed and lower forces are introduced into the deformation elements. At the same time, the material is not overloaded due to the compliant depressions in the upper and lower walls. Breakage, both in the area of the cross member and in the area of the deformation elements can be prevented. In this way, shorter crash boxes can, in turn, be used. As a result, the total weight of the bumper arrangement and also the structural volume can be reduced. These advantages are the result of early, high energy absorption. This in turn is a consequence of the fact that the deformation elements are loaded early on. Without the depression in the front wall, the cross members could have been completely deformed before the deformation elements would be deformed. The advantages of the invention are therefore also based on the upper and lower walls in the end portions that are corrugated to a greater extent. A more amplified depression of the upper and lower walls is to be understood in the sense of a specifically adjusted target deformation in this region, which target deformation should take place more easily in the end regions than in the central region.

According to another advantageous feature of the invention, the depression in the front wall can have a trapezoidal cross section. The depression should have a shape that enables the force from the impact to be introduced into the crash box as early as possible. The trapezoidal cross-section has the advantage that the flanks of the cross section, i.e., an upper and a lower wall of the depression can extend almost vertically to the front wall. Thus, the impact forces can be introduced via these walls directly into the deepest region of the depression and thus into the rear wall of the cross member. A deep depression increases the bending stiffness of the bumper arrangement at the same time.

According to another advantageous feature of the invention, the depression in the front wall can have a depression depth which is greater than 50% of a depth of the cross member as measured in the longitudinal direction of the motor vehicle. The depression as a whole can have a constant depth. As a result of the reduced depth of the cross member in the end regions, the proportion of the total depth that is taken up by the depression is accordingly greater.

According to another advantageous feature of the invention, the depression of the front wall in the area of the end regions can have a depression depth which is greater than 75% of a depth of the cross member as measured in the longitudinal direction of the motor vehicle. Advantageously, the depression depth can be greater than 75% of the depth of the cross member as measured in the end region.

According to another advantageous feature of the invention, the depression of the front wall can have a height measured in a vertical direction of the motor vehicle and extending over 25 to 50% of a height of the cross member. The height of the cross member is defined by the outer distance between the upper wall and the lower wall in the central region.

The cross member may have in addition flanges on the upper and lower walls, for example, for securing the cross member to the deformation elements. Likewise, flanges may be provided in the area of the front wall, which extend upwards and/or downwards locally or continuously and protrude beyond the height of the upper wall or lower wall. Information about heights or depths of the depressions relate with respect to cross members that do not have a constant height over their entire length, to the arithmetically averaged height in the respective end region and the central region.

According to another advantageous feature of the invention, the distance between the depression of the front wall and the rear wall at least in the end regions can amount to between including 5 mm and a maximum of 30% of a depth of the cross member as measured in the central region in the longitudinal direction of the motor vehicle. This allows smaller loads to be absorbed without the crash box being deformed. When the loads increase, the depression serves as impact-rigid trigger in order to introduce the force across the rear wall into the crash boxes early on.

According to another advantageous feature of the invention, the front wall can have a wall thickness which is greater than a wall thickness of walls of the deformation elements. The force should be transmitted via the front wall. The front wall and also the depression on the front wall should hereby, if possible, not deform prematurely, at least not before the forces have been introduced into the deformation element. The thickness ratio (front wall, deformation element) can advantageously be in a range greater than 1.5. For example, the deformation element has a wall to be deformed with a wall thickness of max. 2.4 mm, whereas the front wall has a wall thickness of 4 mm.

Advantageously, different materials or metal alloys, e.g. different aluminum alloys, can be used for the deformation elements and the cross member. The 0.2% yield strength Rp0,2 amounts for the cross member advantageously to at least 300 MPa and for the crash boxes to at least 240 MPa.

In addition, triggers can be arranged in the crash boxes, for example in the form of openings or depressions. Triggers support a controlled and uniform deformation of the crash boxes. In particular, the upper and lower walls of the crash boxes can be designed flexible since the upper and lower walls of the cross member by virtue of the depressions introduced there in the end regions are softer in the sense of more compliant than the central region of the cross member, in which the depression is arranged in the front wall for force transfer of the impact force.

According to another advantageous feature of the invention, the cross member can include transition zones arranged in the end regions to the central region of the cross member, with the transition zones having each a depth which, as measured in vehicle longitudinal direction of the cross member, varies, with the rear wall in the transition zones being configured more curved than the front wall. The depth of the cross member changes in the transition zone because the distance between the depression to the rear wall is reduced. This can be realized through plastic deformation. The rear wall can hereby be curved more in the transition zone than the front wall. The course of the front wall is usually determined by the front contour and rear contour of a motor vehicle. The greater curvature in the rear wall results in that in this region an S-shaped curvature is realized.

A cross member according to the invention can be manufactured cost-effectively as a consequence of a cross section of the depression in the front wall that is as uniform as possible. Advantageously, the distance between the rear wall and the deepest region of the depression at least in the end regions is as small as possible for crash technical reasons and is advantageously in a range between 5 mm and a maximum of 30% of the depth of the cross member as measured in the central region of the cross member and in longitudinal direction of the motor vehicle. From a crash technical point of view, the distance is advantageously between 5 mm and a maximum of 20 mm. In terms of manufacturing technology and in terms of extrusion, a distance of less than 10 mm is more difficult to achieve without subsequent compression molding than greater distances, so that the distance is preferably 10 mm to 20 mm. Smaller values can be achieved by re-pressing, since the end regions are compressed in a press anyway.

The depth of the depression in the front wall is advantageously at least 15 mm. The depressions in the upper and the lower wall can have a depth of 5 to 10 mm. Depressions with smaller depth may extend also over the entire length of the bumper arrangement in the upper and lower walls; however they have a significantly smaller depth in the central region. Advantageously, the upper and the lower wall are substantially straight.

The end portions can have a smaller depth, measured in the direction of travel, than the central region of the cross member. The end portions can be compressed by 5 to 10 mm, for example. The upper and the lower wall can have wall thicknesses which are no greater than 4.5 to 5 mm in order to realize a sufficient bending stiffness in the central region of the cross member. The bending stiffness in the end portions is reduced by the depressions additionally introduced there.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
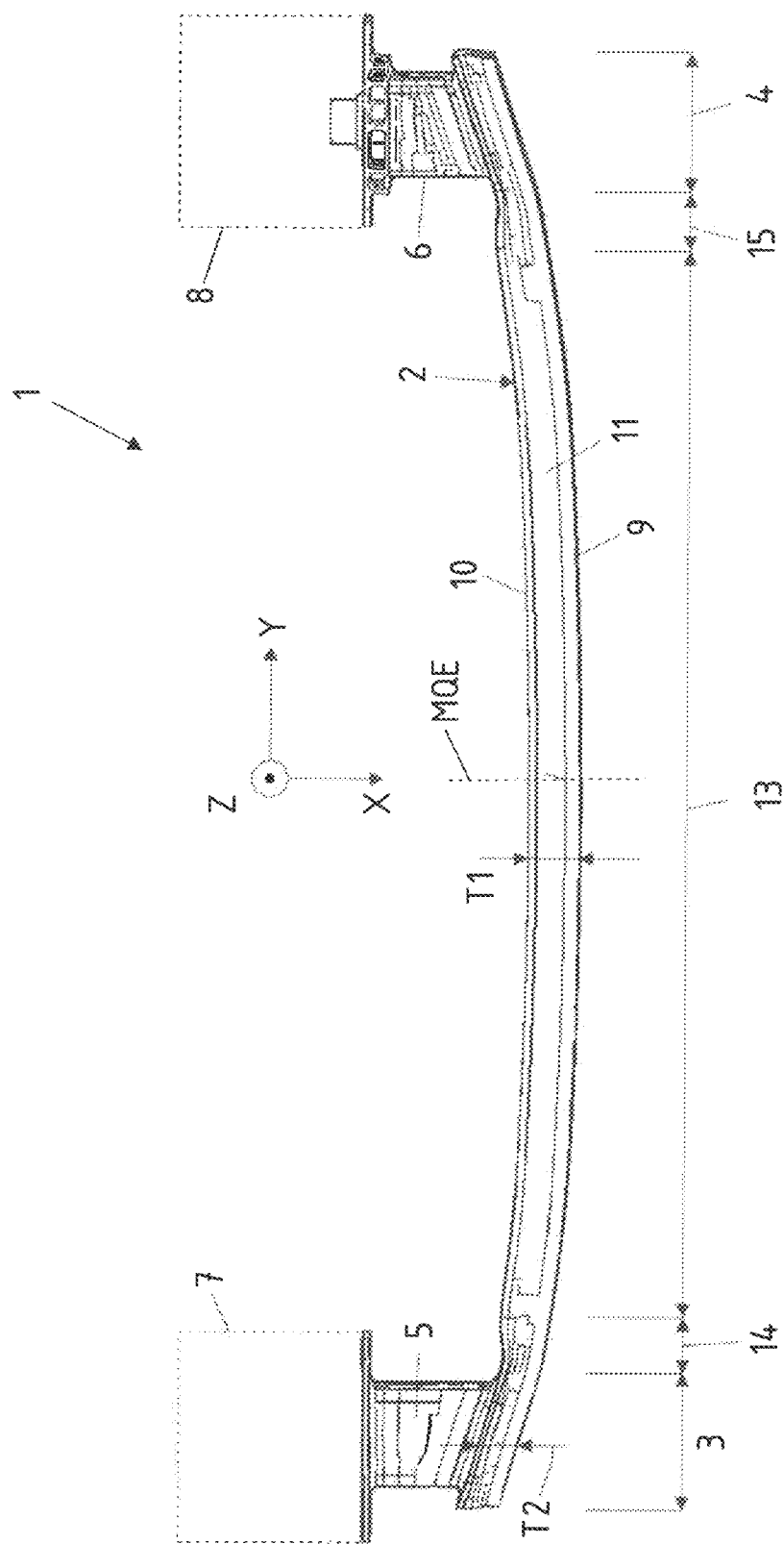
FIG. 1 is a plan view of a bumper arrangement according to the invention.

Throughout all the Figures, same or corresponding elements may generally be indicated by same reference numerals. These depicted embodiments are to be understood as illustrative of the invention and not as limiting in any way. It should also be understood that the FIGS. are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a plan view of a bumper arrangement according to the invention, generally designated by reference numeral 1 and including a cross member 2 made from an extruded hollow profile. The cross member 2 has end regions 3, 4, via which the cross member 2 is attached to deformation elements 5, 6. The deformation elements 5, 6 (crash boxes) are provided for attachment to longitudinal members 7, 8 of a motor vehicle which is not shown any further. The cross member 2 is slightly curved. Its concave rear side faces the center of the vehicle. Its convex front side faces away from the vehicle. A Cartesian coordinate system shows X, Y, and Z directions, to which reference is made hereinafter. The X direction points in longitudinal direction of the vehicle, not shown in greater detail. A depth T1 of the cross member 2 is measured in X direction. A height H1 (FIG. 4) is measured in Z direction. The longitudinal direction of the cross member 2 relates to the course along the longitudinal axis of the cross member 2. This essentially relates to the course in the Y direction. In this sense, a front wall 9 and a rear wall 10 extend in longitudinal direction of the cross member 2, as is an upper wall 11 and a lower wall 12 (FIG. 3) parallel to one another.

As is apparent from the illustration of FIG. 1, the cross member 2 has a central region 13. In this region 13, the cross section of the cross member 2 is constant. A transition zone 14, 15 adjoins the central region 13 in the direction towards both ends. The end portions 3, 4 adjoin the transition zones 14, 15, respectively. The cross member 2 is constructed substantially mirror symmetrically with respect to its center transverse plane MQE. Differences arise, if at all, when the right end portion 4 has an opening for a towing device. Also, the deformation elements 5, 6 are in this sense substantially symmetrical. Adjustments are encountered only by the necessity to connect a towing device with the longitudinal member 8, with the deformation element 6 being placed anteriorly thereof.

Figure 2:
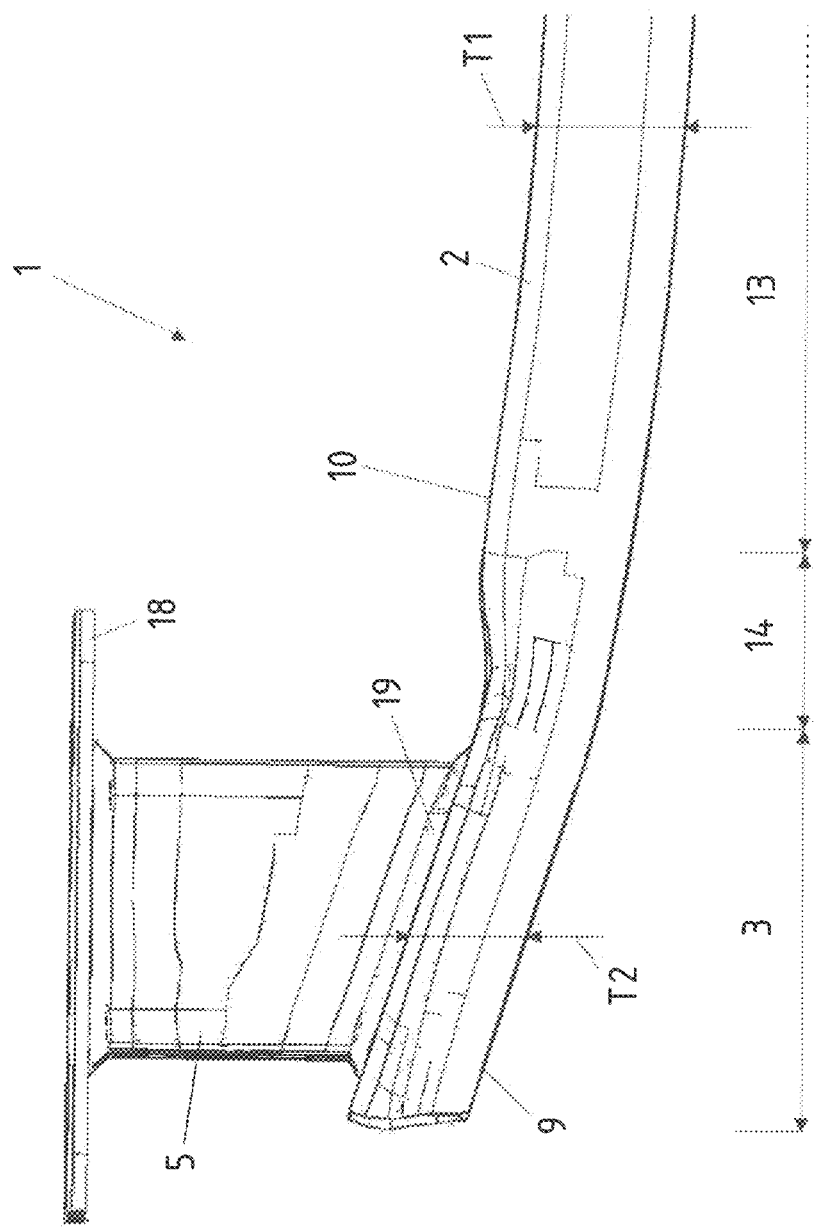
FIG. 2 is a plan view of an end region of the bumper arrangement.

FIG. 2 shows an enlarged view of one of the end portions 3 of the cross member 2. The end region 3 is wider than the transition zone 14. The depth T2 of the cross member 2 as measured in the X direction is, however, smaller than the depth T1 in the central region. The depth T1 is reduced in the transition zone 14. In the transition zone 14, the course of the front wall 9 a slightly more curved, with the course of the front wall 9 continuing essentially straight in the region of the deformation element 5. The rear wall 10 runs parallel to the front wall 9 both in the central region 13 and in the end region 3. There are only deviations from this in the transition zone 14. In this area, the rear wall 10 is curved in an S-shape and slightly approaches the front wall 9 from the central region 13 to the end regions 3. This pattern has been made through plastic deformation of the end region 3 and the transition zone 14.

The deformation element 5 includes a flange plate 18 for securement to the motor vehicle. Instead of the flange plate, the deformation element can also be designed to be plugged into a longitudinal member of the motor vehicle and threadably engaged to it. A front side 19 of the deformation element 5 is not parallel to the flange plate 18, but rather conforms to the course of the rear wall 10 of the cross member 2. The front side 19 of the deformation element 5 and the rear wall 10 of the cross member 2 are firmly secured to each other.

Figure 3:
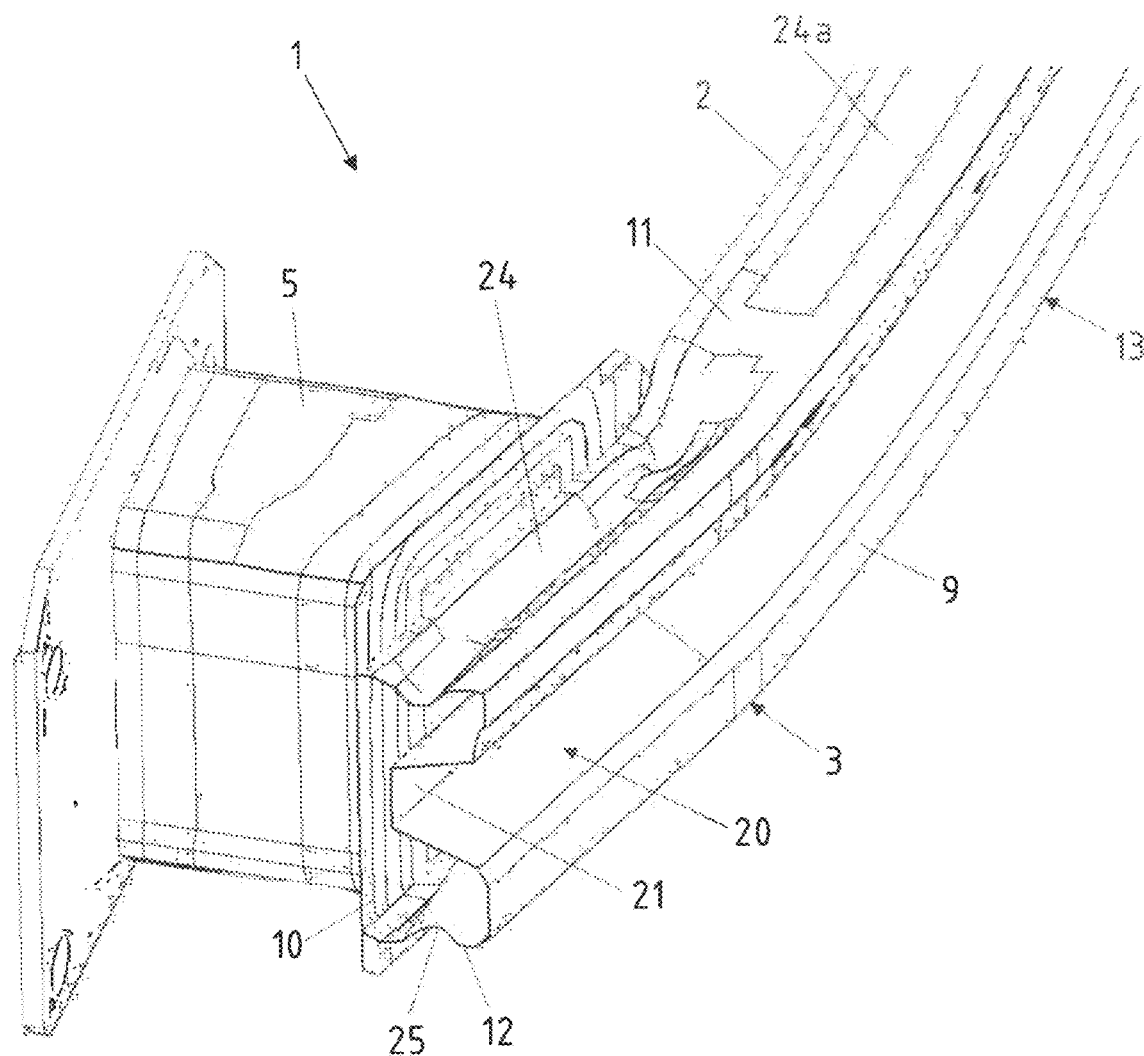
FIG. 3 is a perspective view of an end region of the bumper arrangement.

FIG. 3 shows a perspective view of the cross-section of the cross member 2. The cross member 2 has a depression 20 in its front wall 9. It extends over the entire length of the cross member 2. An open depression is involved here because it extends through the end regions 3, 4 and is open to the outermost ends of the cross member 2. The depression 20 has a trapezoidal cross section with a deepest region 21. This deepest region 21 extends parallel to the rear wall 10. This deepest region 21 of the depression 20 is located closer to the rear wall 10 than to the front wall 9.

As is apparent from the illustration of FIG. 3, the horizontal distance D1 (FIG. 4) from the deepest region 21 to the rear wall 10 is relatively small. In the area of the end portion 3, the distance is in an order of magnitude between 5 to 10 mm. Accordingly, the depression 20 is relatively deep. The depression depth T3 of the depression 20 is greater than 50% of the depth T1 of the cross member 2 as measured in longitudinal direction, i.e. the one in X direction of the motor vehicle. The sectional plane of FIG. 4 is located in the end region 3 of the cross member 2.

The height H2 of the depression 20 is also relatively great in relation to the height H1 of the cross member 2, as measured from the outside between the upper wall 11 and lower wall 12. The height H2 increases from the deepest region 21 to the mouth of the depression 20, i.e. toward the front wall 9, because the upper depression wall 22 and the lower depression wall 23 are slightly inclined. The upper depression wall 22 and the lower depression wall 23 extend otherwise straight. As a result, the height H2 in the area of the front wall 9 extends over 25 to 50% of the height H1 of the cross member 2.

Figure 5:
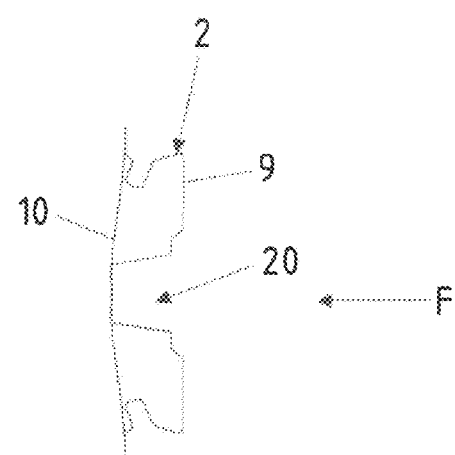
FIG. 5 is a cross section through the end region of the cross member during a crash.

The great depression depth T3 of the depression 20 causes the deepest region 21 to contact the rear wall 10 early on in the event of an impact upon the front wall 9. FIG. 5 shows this early point in time of the impact. The depression 20 and the deepest region 21 with the upper and lower depression walls 22, 23 should hereby behave relatively stiff, whereas the upper wall 11 and the lower wall 12 should be compliant. For this reason, a further depression 24 is located in the upper wall 11. Also in the lower wall 12 there is a corresponding depression 25. FIG. 3 shows that the depressions 24, 25 are open toward the free end of the cross member 2. The depressions 24, 25 are located in the end regions 3, 4 and begin in the transition zones 14, 15. The depressions 24, 25 are produced by shaping the end portions 3, 4, whereas the rear wall 10 has been shifted in direction of the front wall 9. The depressions 24, 25 point hereby inwardly, i.e. toward the deep depression 20 in the front wall 9. As is readily apparent from the illustration of FIG. 3, there is also a depression 24a in the central region 13 in the upper wall 11. This depression 24a is, however, very flat, so that the upper wall 11 as well as the identically shaped lower wall 12 can be considered as substantially straight or stretched. As a result, the corrugation and the resulting curvature of the upper wall 11 and the corrugation of the lower wall 12 are greater in the central region due to the deeper depressions 24, 25 in the end regions 3, 4.

Figure 4:
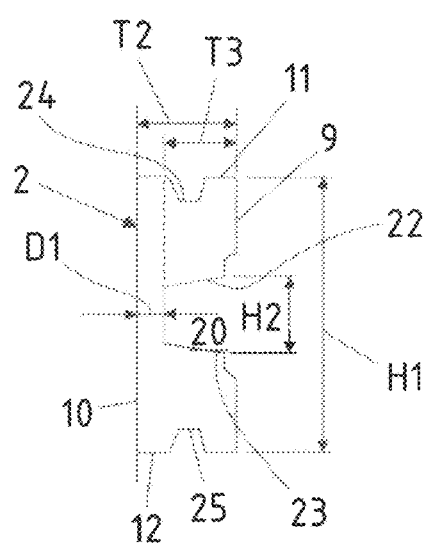
FIG. 4 is a sectional illustration through the end region of the cross member before a crash.

FIG. 5 shows the sectional illustration according to FIG. 4 at a point in time shortly after the deepest portion 21 of the depression 20 has touched the rear wall 10. The rear wall 10 should be deformed in a targeted way, so that the deformation continues into the deformation element (not shown in detail here). The depression 20 thus serves as trigger for the deformation element in order for the deformation of the deformation element to begin before the deformation of the end portions 3, 4 of the cross member 2 is completed. As is apparent from the illustration, depressions 24, 25 deform differently than the deep depression 20 in the front wall 9.

Figure 6:
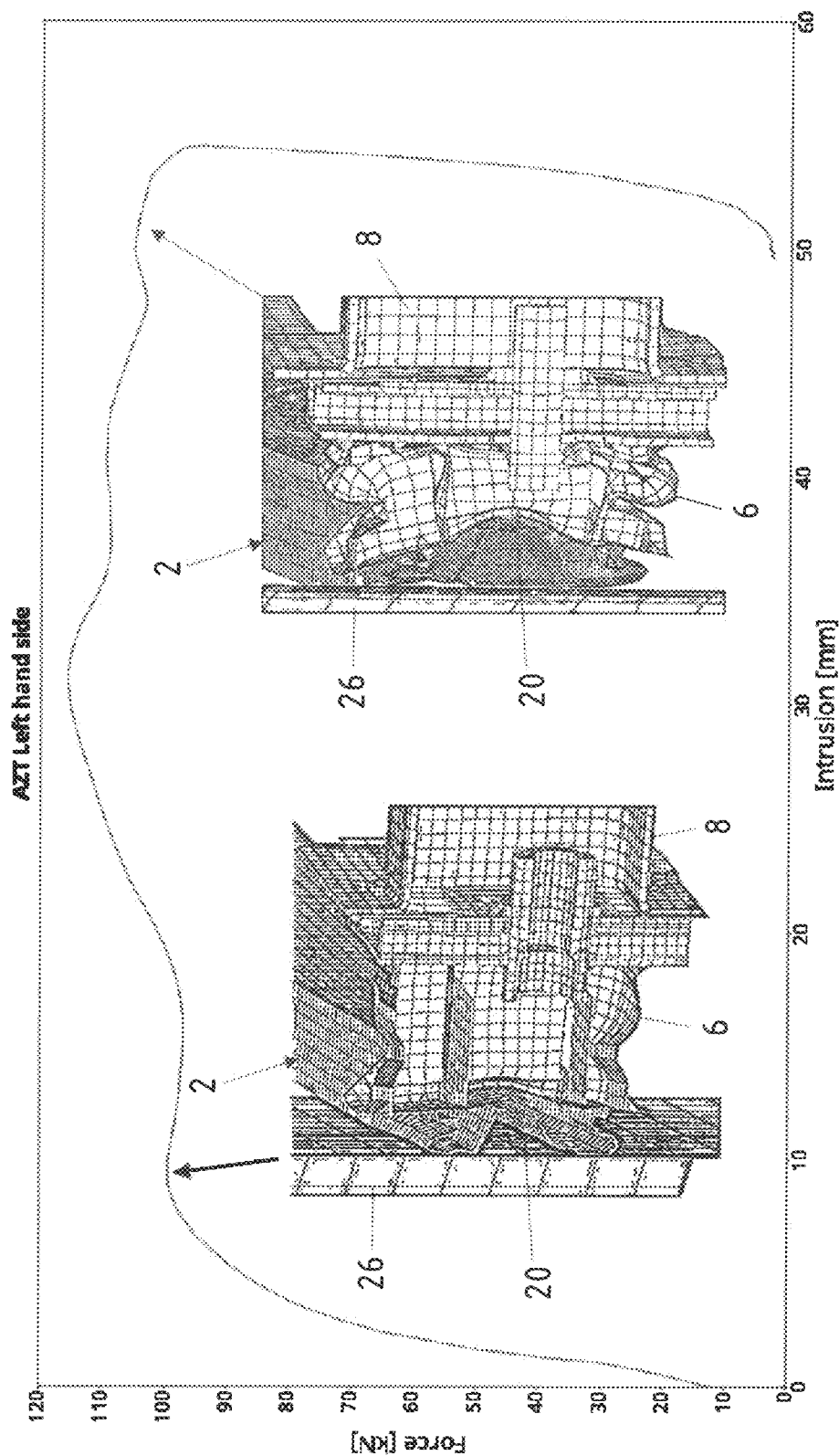
FIG. 6 is a force-path diagram during the crash.

FIG. 6 shows a force-path diagram, in which the force encountered during the deformation is plotted over the depth of penetration during an impact. In addition, a cross-sectional view through a left-side bumper attachment is depicted. The same reference signs as have been introduced in the foregoing exemplified embodiment are used. At an early point in time of the crash, the test specimen 26 deforms initially only the end portions of the cross member 2, with the depression 20 with its low-lying region 21 abutting against the rear wall 10. The rear wall 10 is deformed in its middle height area, so that the deformation of the deformation element is initiated. From the course of the curve, it can be seen that a relatively constant force course is established until the maximum penetration depth is reached. In the drawing plane to the right, the simulation shows that the depression 20 has penetrated the deformation element 6 fairly far, when the maximum penetration depth has been reached. The deformation element 6 is deformed such that the cross member 2 with its end region in the middle height area of the deformation element has penetrated deeper into the deformation element 6 than in the upper and lower height areas of the deformation elements 6. This penetration causes the deformation element 6 to dissipate energy early on impact through deformation, while the end region of the cross member 2 has not fully deformed.

Figure 8:
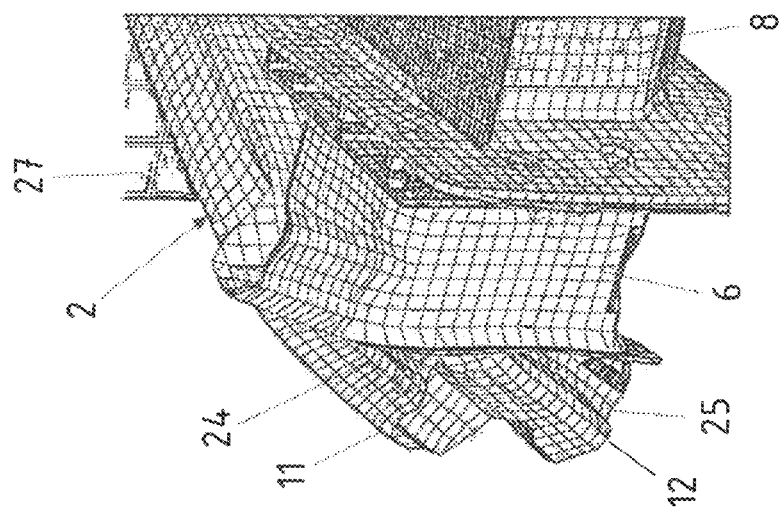
FIG. 8 is the crash situation of FIG. 7 by way of a perspective view of an end region.
Figure 7:
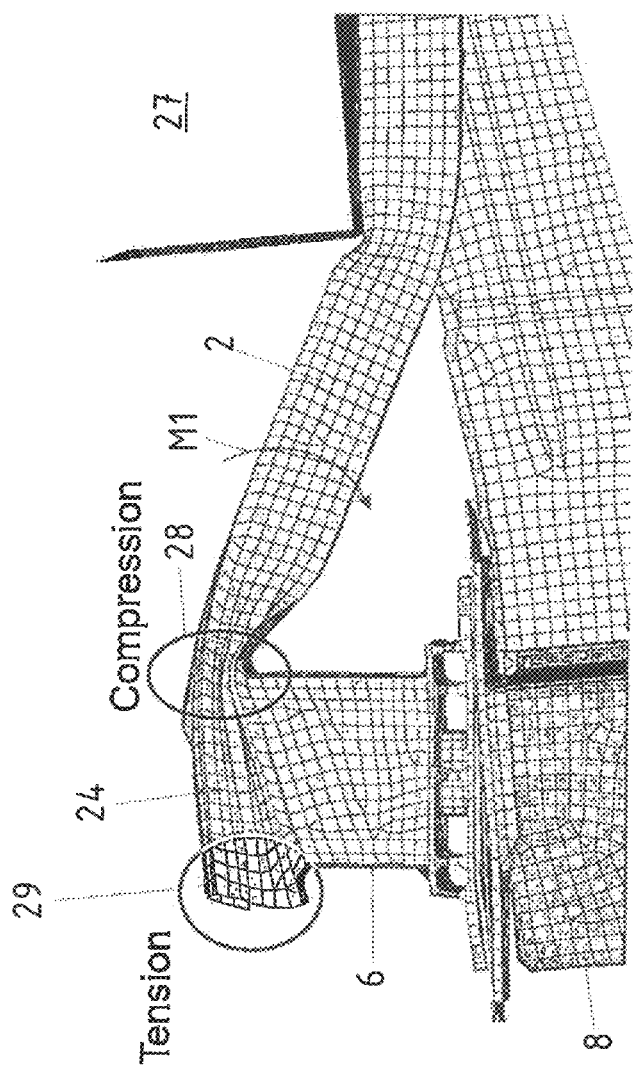
FIG. 7 is a plan view of a further crash situation.

While FIG. 6 shows an impact at low speed, FIGS. 7 and 8 depict a different load case. A test specimen 27 attacks in the central region of the motor vehicle. The impact speed is high. As a result, two deformation regions of the cross member 2 are formed in the area of the crash box. In a region 28, designated with "Compression", the cross member 2 is compressed due to the depressions 24, 25 in the upper wall 11 and in the lower wall 12. The depressions 24, 25 in the region 28 prevent cracks in the cross member 2. The material behaves resiliently there. At the same, the torque M1 exerts a tensile force on an outermost end region 29 of the cross member 2. This region is designated with "Tension". This tensile force causes this region to widen.

As can be seen from the perspective illustration of FIG. 8, the depressions 24, 25 in the upper wall 11 and the lower wall 12 have been stretched by the impact. The depressions 24, 25 virtually serve as expansion joint to prevent the cross member 2 from breaking off from the deformation element 6 in the presence of particularly high torques M1. If the cross member 2 were to break off from the deformation element 6 in the region 29, no deformation energy could be absorbed by the end region 3. There would only be a rotation about the region 28. The depressions 24, 25 in the upper and lower walls 11, 12 have therefore a dual function, depending on the crash scenario.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A bumper arrangement, comprising:
a cross member designed as a hollow profile and having a central region and end regions, said cross member having a front wall, a rear wall, an upper wall and a lower wall, said front wall having a depression which extends in a longitudinal direction of the cross member and has a deepest region which extends at a distance from the rear wall, wherein the upper and lower walls in the end regions of the cross member each have a further depression which extends in the longitudinal direction of the cross member, so that the upper wall and the lower wall in the end regions are depressed more than in the central region of the cross member, so that the distance between the front wall and the rear wall in the end regions is smaller than in the central region of the cross member; and
two deformation elements for arrangement between end regions of the cross member and longitudinal members of a motor vehicle,
wherein the distance between the depression of the front wall and the rear wall at least in the end regions amounts to between including 5 mm and a maximum of 30% of a depth of the cross member as measured in the central region in the longitudinal direction of the motor vehicle.

2. The bumper arrangement of claim 1, wherein the cross member is an extrusion profile, with the depressions in the end regions being made by a forming process, and wherein the depression in the front wall in an area of the end regions has a distance to the rear wall which distance is smaller than a distance in the central region of the cross member.

3. The bumper arrangement of claim 1, wherein the depression in the front well has a trapezoidal cross section.

4. The bumper arrangement of claim 1, wherein the depression in the front wall has a depression depth which is greater than 50% of a depth of the cross member as measured in the longitudinal direction of the motor vehicle.

5. The bumper arrangement of claim 1, wherein the depression of the front well in the area of the end regions has a depression depth which is greater than 75% of a depth of the cross member as measured in the longitudinal direction of the motor vehicle.

6. The bumper arrangement of claim 1, wherein the depression of the front well has a height measured in a vertical direction of the motor vehicle and extending over 25 to 50% of a height of the cross member.

7. The bumper arrangement of claim 1, wherein the distance between the depression of the front wall and the rear wall is 5 to 20 mm.

8. The bumper arrangement of claim 1, wherein the distance between the depression of the front wall and the rear wall is 10 to 20 mm.

9. A bumper arrangement, comprising:
a cross member designed as a hollow profile and having a central region and end regions, said cross member having a front wall, a rear wall, an upper wall and a lower wall, said front wall having a depression which extends in a longitudinal direction of the cross member and has a deepest region which extends at a distance from the rear wall, wherein the upper and lower walls in the end regions of the cross member each have a further depression which extends in the longitudinal direction of the cross member, so that the upper wall and the lower wall in the end regions are depressed more than in the central region of the cross member, so that the distance between the front wall and the rear wall in the end regions is smaller than in the central region of the cross member; and
two deformation elements for arrangement between end regions of the cross member and longitudinal members of a motor vehicle;
wherein the front wall has a wall thickness which is greater than a wall thickness of walls of the deformation elements.

10. The bumper arrangement of claim 9, wherein the cross member is an extrusion profile, with the depressions in the end regions being made by a forming process, and wherein the depression in the front wall in an area of the end regions has a distance to the rear wall which distance is smaller than a distance in the central region of the cross member.

11. The bumper arrangement of claim 9, wherein the depression in the front wall has a trapezoidal cross section.

12. The bumper arrangement of claim 9, wherein the depression in the front wall has a depression depth which is greater than 50% of a depth of the cross member as measured in the longitudinal direction of the motor vehicle.

13. The bumper arrangement of claim 9, wherein the depression of the front wall in the area of the end regions has a depression depth which is greater than 75% of a depth of the cross member as measured in the longitudinal direction of the motor vehicle.

14. The bumper arrangement of claim 9, wherein the depression of the front wall has a height measured in a vertical direction of the motor vehicle and extending over 25 to 50% of a height of the cross member.

15. A bumper arrangement, comprising:

a cross member designed as a hollow profile and having a central region and end regions, said cross member having a front wall, a rear wall, an upper wall and a lower wall, said front wall having a depression which extends in a longitudinal direction of the cross member and has a deepest region which extends at a distance from the rear wall, wherein the upper and lower walls in the end regions of the cross member each have a further depression which extends in the longitudinal direction of the cross member, so that the upper wall and the lower wall in the end regions are depressed more than in the central region of the cross member, so that the distance between the front wall and the rear wall in the end regions is smaller than in the central region of the cross member; and two deformation elements for arrangement between end regions of the cross member and longitudinal members of a motor vehicle, wherein the cross member includes transition zones arranged in the end regions to the central region of the cross member, said transition zones having each a depth which, as measured in vehicle longitudinal direction of the cross member, varies, with the rear wall in the transition zones being configured more curved than the front wall.

16. The bumper arrangement of claim 15, wherein the cross member is an extrusion profile, with the depressions in the end regions being made by a forming process, and wherein the depression in the front wall in an area of the end regions has a distance to the rear wall which distance is smaller than a distance in the central region of the cross member.

17. The bumper arrangement of claim 15, wherein the depression in the front wall has a trapezoidal cross section.

18. The bumper arrangement of claim 15, wherein the depression in the front wall has a depression depth which is greater than 50% of a depth of the cross member as measured in the longitudinal direction of the motor vehicle.

19. The bumper arrangement of claim 15, wherein the depression of the front wall in the area of the end regions has a depression depth which is greater than 75% of a depth of the cross member as measured in the longitudinal direction of the motor vehicle.

20. The bumper arrangement of claim 15, wherein the depression of the front wall has a height measured in a vertical direction of the motor vehicle and extending over 25 to 50% of a height of the cross member.

* * * * *